(12) United States Patent
Cox

(10) Patent No.: US 6,520,040 B2
(45) Date of Patent: Feb. 18, 2003

(54) RANGE CONTROL FOR MANUAL TRANSMISSION

(75) Inventor: Christopher Thomas Cox, Farnworth (GB)

(73) Assignee: Eaton Corporation, Cleveland, OH (US)

( * ) Notice: Subject to any disclaimer, the term of this patent is extended or adjusted under 35 U.S.C. 154(b) by 13 days.

(21) Appl. No.: 09/815,018

(22) Filed: Mar. 22, 2001

(65) Prior Publication Data

US 2001/0025537 A1 Oct. 4, 2001

(30) Foreign Application Priority Data

Apr. 3, 2000 (GB) .............................. 0008025
Apr. 14, 2000 (GB) .............................. 0009188

(51) Int. Cl.[7] .................. F16H 59/00; F16H 61/00; F16H 63/00
(52) U.S. Cl. ............................................. 74/336 R
(58) Field of Search ................................ 74/336 R

(56) References Cited

U.S. PATENT DOCUMENTS

| | | | | |
|---|---|---|---|---|
| 3,682,014 A | * | 8/1972 | Magg et al. ................ 477/125 |
| 5,263,379 A | | 11/1993 | Newbigging et al. ......... 74/336 |
| 5,315,514 A | * | 5/1994 | Steeby et al. ............... 477/122 |
| 5,370,013 A | | 12/1994 | Reynolds et al. ............ 74/330 |
| 5,416,698 A | * | 5/1995 | Hutchison ................... 192/3.3 |
| 5,471,893 A | | 12/1995 | Newbigging ................. 74/335 |
| 5,528,949 A | * | 6/1996 | Stainton et al. ............. 74/335 |
| 5,661,998 A | | 9/1997 | Genise ........................ 74/335 |
| 5,673,592 A | | 10/1997 | Huggins et al. ............. 74/336 |
| 5,737,969 A | | 4/1998 | Braun et al. ................. 74/477 |
| 5,743,143 A | | 4/1998 | Carpenter et al. ........... 74/335 |
| 5,893,292 A | | 4/1999 | Lanting ....................... 74/335 |
| 5,899,121 A | | 5/1999 | Mulvihill et al. ............. 74/745 |
| 5,911,787 A | | 6/1999 | Walker ........................ 74/335 |
| 5,928,109 A | * | 7/1999 | Allen et al. ................. 477/111 |
| 5,950,491 A | | 9/1999 | Wadas ........................ 74/335 |
| 6,042,504 A | * | 3/2000 | Gualtieri et al. ............ 477/111 |
| 6,109,126 A | * | 8/2000 | Cochran et al. ............. 477/908 |
| 6,220,108 B1 | * | 4/2001 | Huggins et al. ............ 74/336 R |
| 6,250,172 B1 | * | 6/2001 | Pigozzi et al. .............. 477/908 |
| 6,257,082 B1 | * | 7/2001 | Ore ............................. 477/79 |
| 6,393,928 B1 | * | 5/2002 | Watanabe ................... 74/336 R |

FOREIGN PATENT DOCUMENTS

WO      99/31409      6/1999

* cited by examiner

*Primary Examiner*—Jack Lavinder
*Assistant Examiner*—Devon Kramer
(74) *Attorney, Agent, or Firm*—Kevin M. Hinman; Howard D. Gordon

(57) ABSTRACT

A control method/system for controlling range section (14) shifting in a range-type transmission (10) having a "repeat-H" shift mechanism. Under certain conditions, a shift from the highest ratio position in low range (4/8) toward the lowest ratio position (1/5) will cause an automatic shift to the high range, even if the range selector (96) is in the low range selection position.

12 Claims, 5 Drawing Sheets

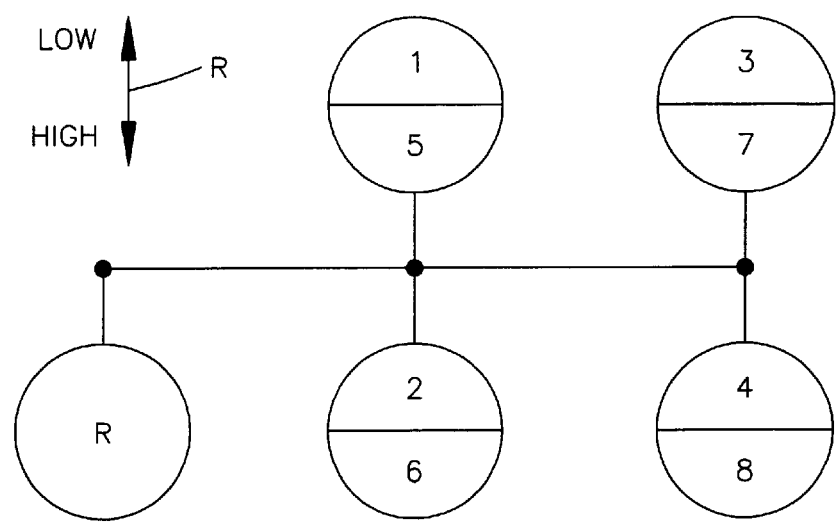
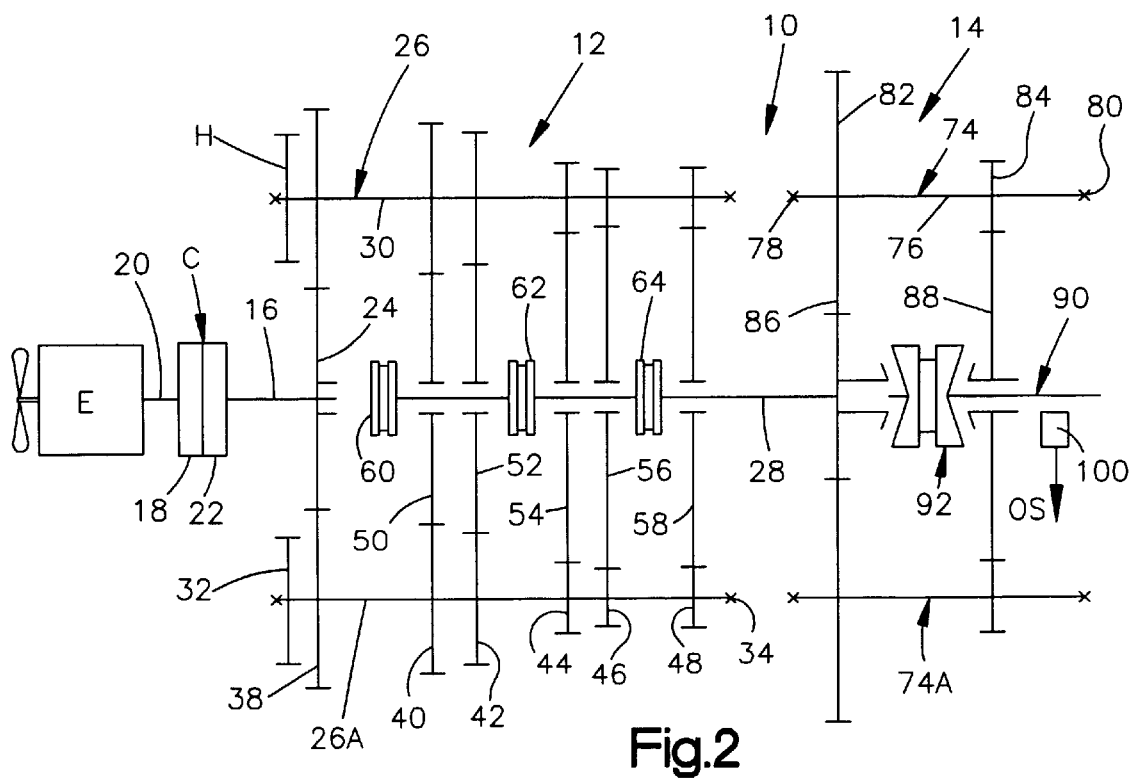

RANGE CONTROL FOR MANUAL TRANSMISSION

BACKGROUND OF THE INVENTION

1. Field of the Invention

The present invention relates to a range shift control for a manually shifted, range-type compound transmission having a "repeat-H" type shift pattern. In particular, the present invention relates to an automatic override for a manually shifted, range-type transmission having a "repeat-H" type shift control with a manually operated range shift selector which, above certain vehicle speeds, will prevent inadvertent shifts from the highest low range ratio into one or more of the lowest low range ratios.

2. Description of the Related Art

Vehicular compound transmissions of the range type, including the combined splitter-and-range type, are well known in the prior art and may be seen by reference to U.S. Pat. Nos. 4,754,665; 5,370,01 3; 5,737,969 and 5,950,491, the disclosures of which are incorporated herein by reference.

Manually shifted, range-type transmissions typically used either a "double-H" type shift pattern wherein range shifting was automatic, or a "repeat-H" type wherein the driver is required to manually operate a range selector, usually a button or switch located on the shift knob assembly. Typical "double-H" shift range shift mechanisms may be seen by reference to U.S. Pat. Nos. 5,661,998 and 5,911,787, while typical "repeat-H" shift mechanisms may be seen by reference to U.S. Pat. No. 5,899,121, the disclosures of all of which are incorporated herein by reference. "Repeat-H" type shifters are often used where side-to-side shift lever movement is to be minimized.

Synchronized transmissions and transmissions utilizing enhanced synchronizers, such as boosted synchronizers, self-engaging synchronizers, double or triple cone synchronizers and/or synchronizers activated through various assist mechanisms, are known in the prior art and may be seen by reference to U.S. Pat. Nos. 5,588,516; 5,713,447; 5,738,194 and 5,738,196, the disclosures of which are incorporated herein by reference. While such enhanced synchronizers are effective to reduce the force required to shift a heavy-duty transmission, they also may permit engagement of ratios which are inappropriate for existing vehicle operating conditions.

The prior art also includes devices which will block inappropriate shifts (see U.S. Pat. No. 5,471,893 and WO 99/31409) and which will cause automatic range shifting as a function of vehicle speed (see U.S. Pat. Nos. 5,263,379 and 5,673,592).

The prior art devices were not totally satisfactory, as they were complicated and/or expensive and/or unduly restricted operator selection of ratios.

BRIEF SUMMARY OF THE INVENTION

In accordance with the present invention, the drawbacks of the prior art are minimized or overcome by provision of a range shift control for a range-type, manually shifted transmission having a "repeat-H" type shift pattern, which requires a minimal amount of added components and which will prevent inadvertent selection and engagement of ratios which could result in catastrophic damage to the transmission, but will otherwise allow the driver to select and engage other ratios.

The foregoing is accomplished by sensing the position of the shift lever in the "repeat-H" type shift pattern and, if the operator shifts from the highest ratio position in low range to the lowest ratio position (or ratio positions) in low range, and if vehicle speed exceeds a predetermined reference value (about 15 to 20 MPH), automatically causing a shift to the high range ratio, regardless of the position of the manually operated range selector switch.

Accordingly, it is an object of the present invention to provide a range shift control for a manually shifted, range-type transmission having a "repeat-H" shift mechanism, which will prevent an inadvertent engagement of a potentially catastrophic downshift.

This and other objects and advantages of the present invention will become apparent from a reading of the following description of the preferred embodiment taken in connection with the attached drawings.

BRIEF DESCRIPTION OF THE DRAWINGS

FIG. 1 is a schematic illustration of a simple "repeat-H" shift pattern.

FIG. 2 is a schematic illustration of a compound transmission having a range-type auxiliary section and utilizing the range section control according to the present invention.

DETAILED DESCRIPTION OF THE INVENTION

The term "compound transmission" is used to designate a change-speed or change-gear transmission having a multiple-forward-speed main transmission section and a multiple-speed auxiliary transmission section connected in series whereby a selected gear reduction in the main transmission section may be compounded by further selected gear reduction in the auxiliary transmission section. "Synchronized clutch assembly" and words of similar import designate a positive, jaw-type clutch assembly utilized non-rotationally coupled a selected gear to a shaft by means of a positive clutch in which attempted engagement of the clutch is prevented until the members of the clutch are at a substantially synchronous rotation. Relatively large-capacity friction means are utilized with the clutch members and are sufficient, upon initiation of a clutch engagement, to cause the clutch members and all members rotating therewith to rotate at substantially synchronous speed.

The term "high speed ratio" and "low speed ratio" and words of similar import refer, respectively, to those ratios of a transmission section wherein the rotational speed of the output is greatest or least for given input rotational speed.

As is well known and as may be seen by reference to aforementioned U.S. Pat. No. 4,754,665, auxiliary transmission sections are of three general types: range type, splitter type or combined range/splitter type. In compound transmissions having a range-type auxiliary section, the range step or steps are greater than the total ratio coverage of the main transmission section and the main section is shifted progressively through its ratios in each range. In compound transmissions having a splitter-type auxiliary section, the ratio steps of the splitter auxiliary section are less than the ratio steps of the main transmission section, and each main section ratio is split, or subdivided, by the splitter section. In a compound range-and-splitter-type auxiliary section or sections, both range- and splitter-type ratios are provided, allowing the main section to be progressively shifted through its ratios in at least two ranges and also allowing the main section ratios to be split in at least one range.

Figure 2A:
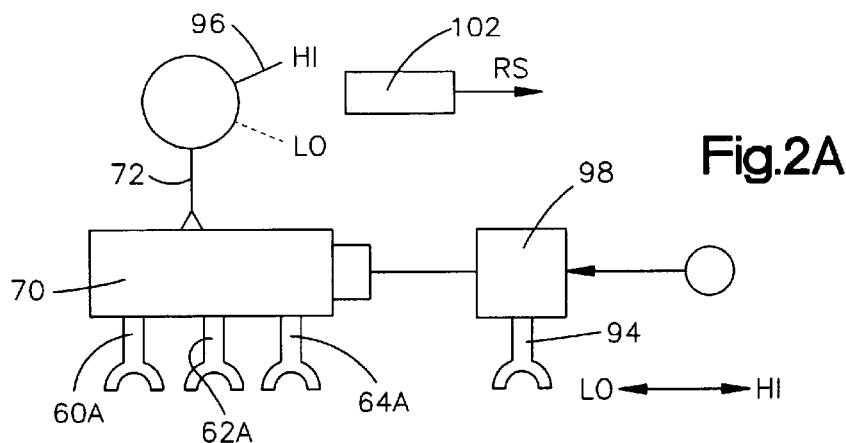
FIG. 2A is a schematic illustration of the shifting mechanism of the transmission of FIG. 2.

FIG. 1 schematically illustrates a "repeat-H" type shift pattern for a manually shifted, range-type transmission having a four-forward-speed and one-reverse-speed main section and a two-speed range section. This is typically referred to as a "4×2" range-type transmission. As may be seen, in low range, the shift lever is progressively moved through first, second, third and fourth gears in a well-known "H" pattern, with the range selector switch in the range-low position (see member 96 in FIG. 2A). Upon reaching fourth gear and desiring to continue upshifting through the upper range, the range selector switch 96 is moved to the high range position, and the main section is shifted back through fifth, sixth, seventh and eighth gears. In the shift pattern of FIG. 1, the arrow R indicates the two ratios available, one in low range and one in high range, for each of the main section shift lever positions, as is well known in the prior art.

A potential problem exists if, when in fourth gear and intending to upshift to fifth gear, the operator neglects to select a range shift from range-low to range-high and, thus, while intending an upshift from fourth to fifth, actually selects and attempts to engage a fourth-to-first downshift. Assuming the vehicle is traveling at a speed at which a fourth-to-fifth upshift is required, inadvertently engaging first gear may result in a catastrophic failure of the transmission gearing. In non-synchronized transmissions and in transmissions utilizing relatively simple prior art synchronizers, this problem was often alleviated, as attempting to engage first gear with the vehicle traveling at a substantial speed was difficult or impossible and provided a warning to the driver that an inappropriate shift was being attempted. However, with enhanced synchronizers and/or synchronizer-assist mechanisms, almost any attempted shift can be completed, causing the possibility that an inadvertent downshift from fourth to first, while expecting an upshift from fourth to fifth, will be accomplished without providing sufficient warning to the operator. The purpose of the present invention is to prevent such inadvertent shifts from the highest ratio available in the low range (i.e., fourth gear) to the lowest ratio available in the low range if vehicle speed is above a predetermined value (such as about 15–25 MPH).

A range-type transmission 10 utilizing the range shift control of the present invention may be seen by reference to FIGS. 2, 2A, 2B and 2C. Compound transmission 10 comprises multiple-speed main transmission section 12 connected in series with a range-type auxiliary section 14. Transmission 10 is housed within a housing H and includes an input shaft 16 driven by an engine, such as a diesel engine E, through a selectively disengaged, normally engaged, master clutch C having an input or driving portion 18 drivingly connected to engine crankshaft 20 and a driven portion 22 rotatably fixed to the transmission input shaft 16.

In main transmission section 12, input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28, which is generally coaxially aligned with input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48 fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64, as is well known in the prior art. Clutch collar 60 also may be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as is well known in the prior art. Clutch collars 60, 62 and 64 may be of the well-known synchronized or non-synchronized, double-acting jaw clutch type.

Mainshaft gear 58 is the reverse gear and is in continuous meshing engagement with countershaft gears 48 by means of conventional intermediate idler gears (not shown). While main transmission section 12 does provide five selectable forward speed ratios, the lowest forward speed ratio, namely that provided by drivingly connecting mainshaft drive gear 56 to mainshaft 28, is often of such a high gear reduction that it has to be considered a low or "creeper" gear, which is utilized only for starting of a vehicle under severe conditions and is not usually utilized in the high transmission range. Accordingly, while main transmission-section 12 does provide five forward speeds, it is usually referred to as a "4+1" main section, as only four of the forward speeds are compounded by the auxiliary range transmission section 14.

For purposes of the range control of the present invention, the "1/5" shift pattern position, and gear 54, will be considered "the lowest ratio position available in low range," as that is the lowest speed main section ratio position available in both low and high ranges. Alternatively, both the 1/5 and 2/6 positions, both of which are engaged when the shift lever is in the same horizontal or selection position, may be collectively considered as the lowest ratio position available in low range as they are at the lowest speed selection position available in both ranges.

Jaw clutches 60, 62 and 64 are three-position clutches in that they may be positoned in the centered, non-engaged position as illustrated, or in a fully rightwardly engaged or fully leftwardly engaged position by means of a shift lever 72. As is well known, only one of the clutches 60, 62 and 64 is engageable at a given time, as main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86, which is fixed for rotation with mainshaft 28. Auxiliary section countershaft gears 84 are constantly meshed with output gear 88, which surrounds transmission output shaft 90.

Figure 2B:
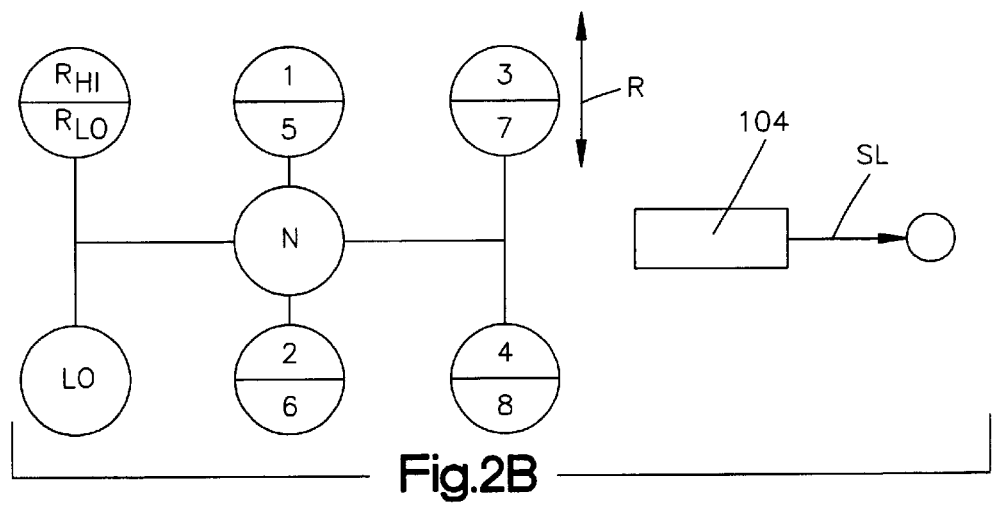
FIG. 2B is a schematic illustration of the "repeat-H" type shift pattern for the transmission of FIG. 2.

A two-position, synchronized jaw clutch assembly 92 is axially positioned by means of shift fork 94 and the range section shifting actuator assembly 96. Jaw clutch assembly 92 is provided for clutching either gear 88 to output shaft 90 (for low range operation), or gear 86 to output shaft 90 (for direct or high range operation). The "repeat-H" type shift pattern for compound range-type transmission 10 is schematically illustrated in FIG. 2B. Selection and/or preselection of low or high range operation of the transmission 10 is accomplished using an operator-actuated switch or button 96, which is usually located at the shift lever 72.

Although the range-type auxiliary section 14 is illustrated as a two-speed section utilizing spur- or helical-type gearing, it is understood that the present invention is also applicable to range-type transmissions. utilizing combined splitter/range-type auxiliary sections having three or more selectable range ratios and/or utilizing planetary-type gearing. Also, as indicated above, any one or more of clutches 60, 62 or 64 may be of the synchronized jaw clutch type. Likewise, transmission sections 12 and/or 14 may be of the single countershaft type.

Main transmission section 12 is controlled by axial movement of at least one shift rail or shift shaft contained within shift bar housing 70 and controlled by operation of shift lever 72. As is known, shift lever 72 may be mounted directly to or remotely from the transmission. Devices of this type are well known in the prior art and may be seen by reference to U.S. Pat. No. 4,621,537, the disclosure of which is incorporated herein by reference. The range section is controlled by operation of button 98 or range switch RS having a low or high position, well known in the prior art (see U.S. Pat. Nos. 5,193,410 and 5,231,895. Shift bar housing 70 may be a conventional multiple shift rail, well known in the prior art, as may be seen by reference to U.S. Pat. Nos. 4,782,719; 4,738,863; 4,722,237 and 4,614,126, the disclosures of which are incorporated herein by reference, or a single shift shaft, also well known in the art.

A speed sensor 100 is provided to sense the rotational speed of the output shaft and to provide a signal OS, which is indicative of vehicle speed. The position (high or low) of the range switch 96 is provided by a sensor 102, which provides a signal RS.

A sensor 104 will provide a signal SL indicative of the position of the shift lever 72 in the shift pattern. One embodiment of sensors of this type is illustrated in U.S. Pat. Nos. 5,743,143 and 5,950,491, the disclosures of which are incorporated herein by reference.

Figure 2C:
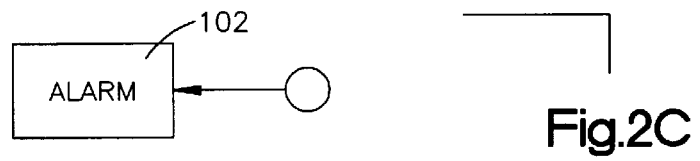
FIG. 2C is a schematic illustration of a range control system for the transmission of FIG. 2 according to the present invention.

Referring of FIG. 2C, a microprocessor-based controller 106 receives inputs 108 and processes same according to logic rules to issue command output signals to various system actuators. The inputs 108 will include at least the signals RS, SL and OS and command output signals will be issued to least range actuator 96 and to an alarm device 112. Preferably, range actuator 98 will have a mode of operation wherein its position (high or low range will be determined by the controller, regardless of the position of the range switch 96 (see, for example, U.S. Pat. No. 5,893,292);

Signals may travel by a vehicle data link, such as an SAE J-1922 or SAE J-1939 compliant data link, and the controller 106 may be the engine or the transmission controller.

Figure 4:
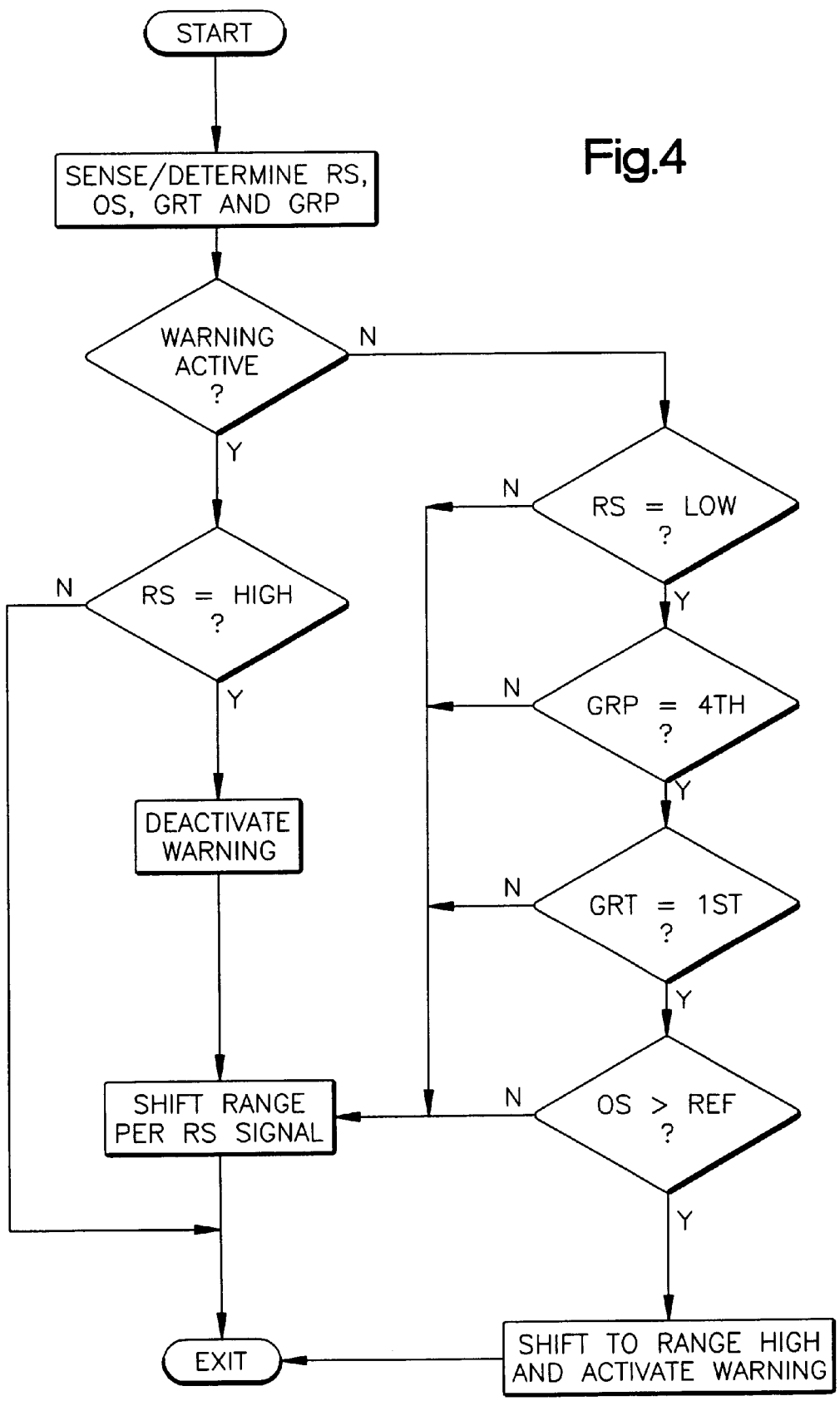
FIG. 4 is a schematic illustration, in flow chart format, of the control logic utilized by the range shift control of the present invention.

The operation of the range control of the present invention may be seen by reference to the flow chart of FIG. 4.

The system controller 106 will sense or determine the position of the range switch 96 (RS), the speed of the vehicle (OS), and the previously engaged (GRP) and target gear ratios (GRT), which may be determined from the signal (SL) from the shift lever position sensor 104. Assuming the warning or alarm 102 is not active, the system will allow the range actuator 98 to shift the range section in accordance with the selector 96 position unless four preconditions are met:

(i) the range selector is in the "low" position;
(ii) the transmission has been shifted from the highest ratio ($GR_P$=4th) in low range;
(iii) the target ratio is the (or one of the) lowest low range ratio ($GR_T$=1st); and
(iv) vehicle speed exceeds a reference (OS>REF).

The "lowest low range ratio" includes first, as first is in the "1/5" shift pattern position, which is the lowest main section ratio position occurring in both low and high ranges. The REF value for OS is selected to correspond to a vehicle speed at which at upshift into a high range ratio is expected (for example, about 15–20 MPH).

If all four conditions are true, this is indicative of an operator's intending to make a fourth-to-fifth upshift but, due to a failure to select a range-high position, actually attempting to engage first at an unacceptably high vehicle speed. Under such conditions, the controller will cause an automatic shift to range-high, contrary to the position of the range selector 96, and will cause a visual or audible alarm 102 to be activated. Preferably, the alarm 102 will remain active, and the range will remain in high range position, regardless of selector position, vehicle speed, etc., until the operator shifts the range selector to the high range position.

Figure 3:
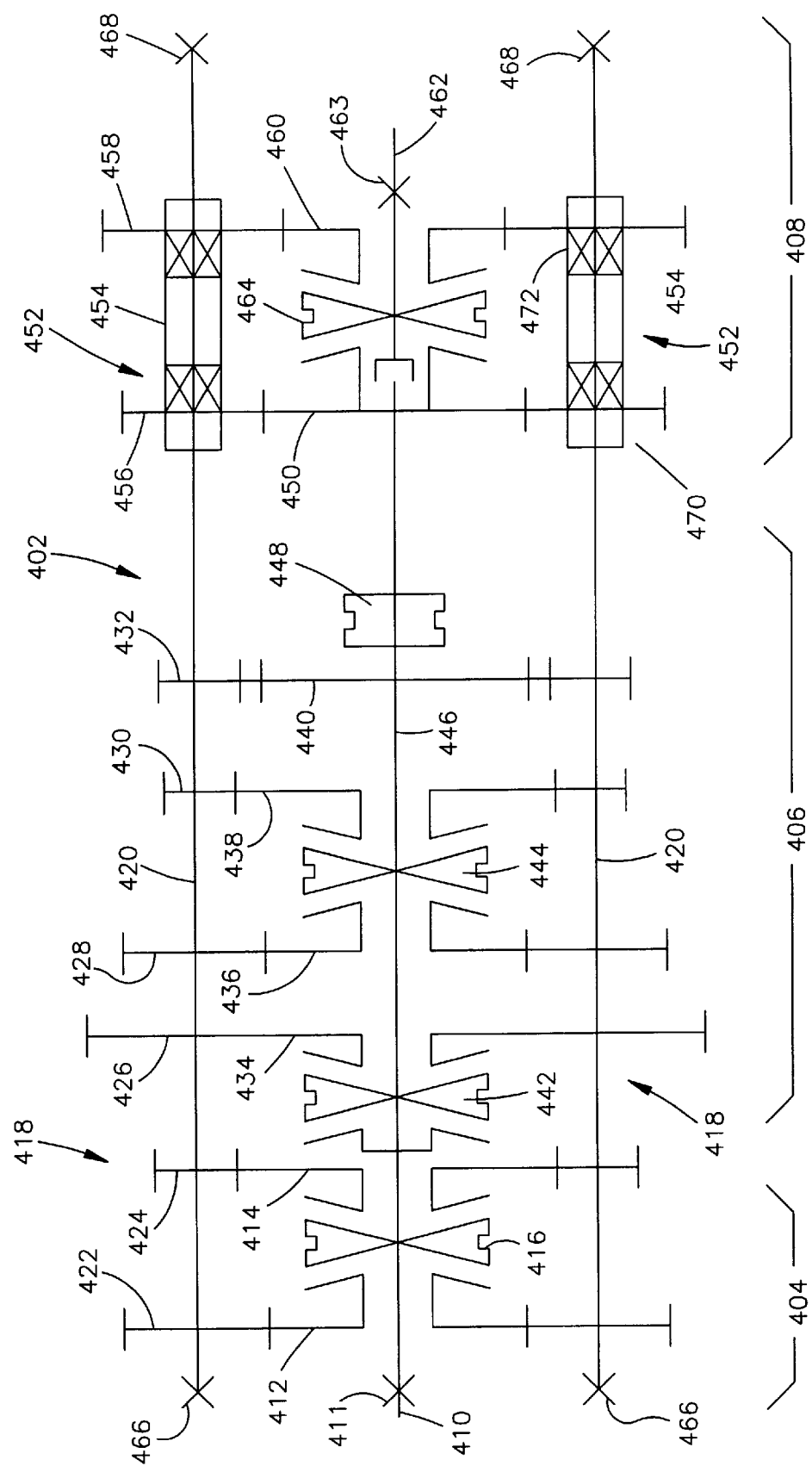
FIG. 3 is a schematic illustration of a compound transmission of the combined range-and-splitter type utilizing enhanced synchronizer clutches and the range control system of the present invention.
Figure 3A:
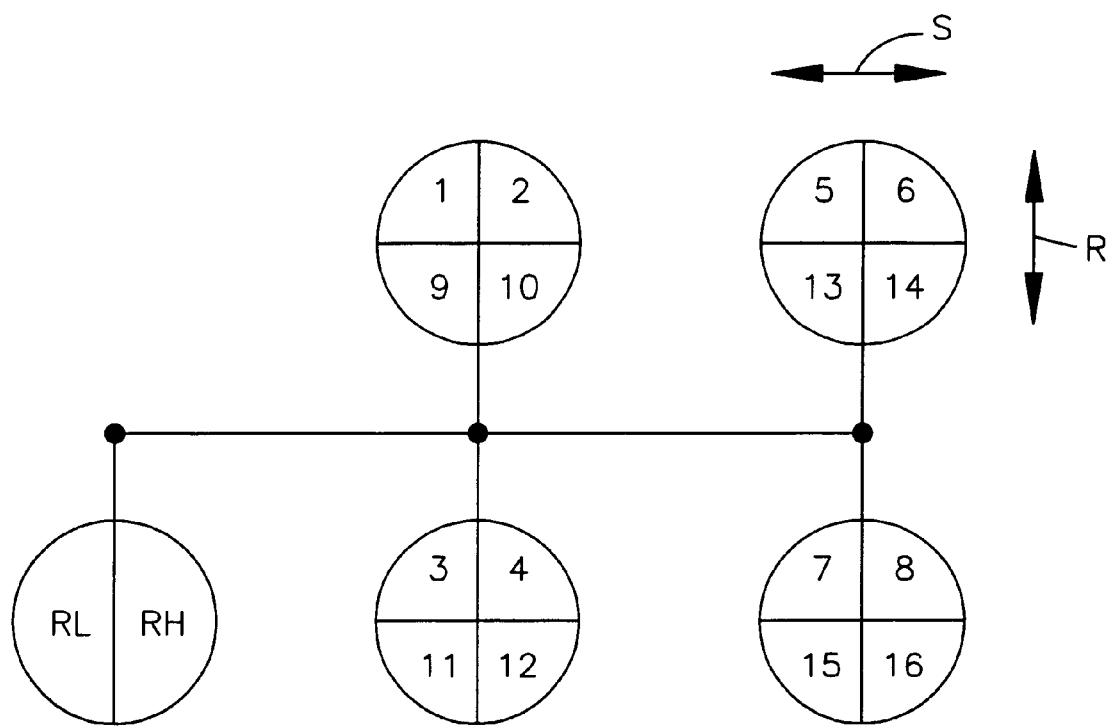
FIG. 3A is a schematic illustration of the "repeat-H" type shift pattern for the transmission of FIG. 3.

FIGS. 3 and 3A illustrate, respectively, a combined splitter-and-range-type transmission, and "repeat-H" shift pattern therefor, which advantageously utilizes the range control of the present invention.

Transmission 402 is a "2×4×2" type 16-speed transmission having a two-speed splitter section 404, a four-forward-speed main section 406 and a two-speed range section 408, all connected in series. The gearing of transmission.402 may be helical.

Briefly, an input shaft 410 is supported in the transmission housing forward wall (not shown) by bearing 411 and is surrounded by two input gears 412 and 414, a selected one of which is clutched to the input shaft by synchronized clutch 416 to provide a two-speed splitter input section. Front countershaft assemblies 418 each include a countershaft 420 carrying countershaft gears 422, 424, 426, 428, 430 and 432. Gears 422 and 424 are constantly meshed with the input gears 412 and 414. In main section 416, gears 426, 428, 430 and 432 are constantly meshed with mainshaft gears 434, 436, 438 and a reverse idler (not shown) meshed with reverse mainshaft gear 440. Double-acting, synchronized jaw clutches 442 and 444 are provided on mainshaft 446 to clutch the mainshaft 446 to a selected one of the input shaft 410 or mainshaft gears 434, 436 or 438. Non-synchronized clutch 448 is used to clutch the reverse mainshaft gear 440 to the mainshaft 446.

The rearward end of mainshaft 446 extends into the two-speed range section 408 and carries gear 450 fixed for rotation therewith. A pair of auxiliary section countershaft assemblies 452 each include an auxiliary section countershaft 454 carrying two auxiliary section countershaft gears 456 and 458. Gear 456 is constantly meshed with auxiliary input gear 450, while gear 458 is constantly meshed with an output gear 460 surrounding output shaft 462. Output shaft 462 is supported in the housing rear end wall (not shown) by bearing(s) 463. A two position, synchronized range clutch 464 is carded by the output shaft 462 and is utilized to clutch either output gear 460 or mainshaft 446 to the output shaft 462.

Bearings 466 and 468 are used to rotatably mount the front countershafts 420 to the forward and rearward end walls (not shown) of a transmission housing. Auxiliary countershafts 454 are generally tubular members telescopically surrounding the rear ends of the front countershafts and may be supported thereon by needle bearings 470 and 472 or the like. The mainshaft is supported by the input shaft and/or output shaft.

The synchronized jaw clutches 442 and 444 are preferably of the enhanced type and/or operated by boost or assist mechanisms, allowing almost any attempted shift to be relatively easily completed.

Referring to FIG. 3A, a shift from the highest main section ratio in the low range will include a shift from eighth (or from either seventh or eighth), and a shift to the lowest main section ratio in low range will include a shift toward first or either first or second, i.e., ($GR_T$=1st) or ($GR_T$=1st or 2nd).

The present invention will also include systems where, referring to the transmission of FIGS. 3 and 3A, if shifting from seventh or eighth and speed exceeds the reference value, a target ratio of any one of first, second, third or fourth will result in an automatic shift to high range and activation of the alarm.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling range section shifting in a manually shifted, vehicular compound transmission having a manually shifted main section connected in series with a range section having a high range ratio and a low range ratio, said main transmission section having a plurality of ratio positions (1/5, 2/6, 3/7, 4/8) available in both high and low range, including a highest ratio position (4/8) and a lowest ratio position (1/5), a sensor for sensing a current position of a shift selector manually movable in a shift pattern to selectively engage and disengage main section ratios, a range section actuator for shifting the range section in response to command signals, a manually operated range switch for selecting engagement of one of the high or low range ratios, a speed sensor for sensing vehicle speed and providing a signal indicative thereof, and a controller for receiving input signals, including said signals indicative of the current position of the shift selector and of vehicle speed, and processing same according to predetermined logic rules to issue command output signals to system actuators, including said range section actuator, said method including the steps of:
   (i) determining vehicle speed, position of the range selector switch, previously engaged ratio and target ratio;
   (ii) if (a) vehicle speed exceeds a reference (OS>REF), (b) the range selector switch is in the low range ratio position, (c) the previously engaged ratio position is the highest ratio position (4/8), and (d) the target ratio position is the lowest ratio position (1/5), then commanding the range actuator to shift to the high range ratio; and
   (iii) if any one of (ii)(a), (ii)(b), (ii)(c) or (ii)(d) is not true, allowing the range actuator to shift the range section to the range ratio indicated by the range selector switch.

2. The method of claim 1 wherein, if (ii)(a), (ii)(b), (ii)(c) and (ii)(d) all are true, also activating an alarm and maintaining the range actuator in the high range ratio until the range switch is moved to the high range ratio selection position thereof.

3. The method of claim 1 wherein at least said lowest ratio position is engaged by a synchronized jaw clutch.

4. The method of claim 1 wherein at least said lowest ratio position is engaged by an enhanced synchronizer synchronized jaw clutch.

5. The method of claim 2 wherein at least said lowest ratio position is engaged by a synchronized jaw clutch.

6. The method of claim 2 wherein at least said lowest ratio position is engaged by an enhanced synchronizer synchronized jaw clutch.

7. A system for controlling range section shifting in a manually shifted, vehicular compound transmission (10) having a manually shifted main section (12) connected in series with a range section (14) having a high range ratio and a low range ratio, said main transmission section having a plurality of ratio positions (1/5, 2/6, 3/7, 4/8) available in both high and low range, including a highest ratio position (4/8) and a lowest ratio position (1/5), a sensor (104) for sensing a current position of a shift selector manually movable in a shift pattern to selectively engage and disengage main section ratios, a range section actuator (98) for shifting the range section in response to command signals, a manually operated range switch (96) for selecting engagement of one of the high or low range ratios, a speed sensor (100) for sensing vehicle speed and providing a signal (OS) indicative thereof, and a controller (106) for receiving input signals (108), including said signals indicative of the current position of the range switch (RS), the shift selector (SL) and of vehicle speed (OS), and processing same according to predetermined logic rules to issue command output signals (110) to system actuators, including said range section actuator, said system characterized by said logic rules, including rules for:
   (i) determining vehicle speed, position of the range selector switch, previously engaged ratio and target ratio;
   (ii) if (a) vehicle speed exceeds a reference (OS>REF), (b) the range selector switch is in the low range ratio position, (c) the previously engaged ratio position is the highest ratio position (4/8), and (d) the target ratio position is the lowest ratio position (1/5), then commanding the range actuator to shift to the high range ratio; and
   (iii) if any one of (ii)(a), (ii)(b), (ii)(c) or (ii)(d) is not true, allowing the range actuator to shift the range section to the range ratio indicated by the range selector switch.

8. The system of claim 7 wherein, if (ii)(a), (ii)(b), (ii)(c) and (ii)(d) all are true, also activating an alarm and maintaining the range actuator in the high range ratio until the range switch is moved to the high range ratio selection position thereof.

9. The system of claim 7 wherein at least said lowest ratio position (1/5 or ((1/2)/(9/10))) is engaged by a synchronized jaw clutch (444).

10. The system of claim 7 wherein at least said lowest ratio position is engaged by an enhanced synchronizer synchronized jaw clutch.

11. The system of claim 8 wherein at least said lowest ratio position is engaged by a synchronized jaw clutch.

12. The system of claim 8 wherein at least said lowest ratio position is engaged by an enhanced synchronizer synchronized jaw clutch.

* * * * *